(12) United States Patent
Zheng

(10) Patent No.: US 8,594,103 B2
(45) Date of Patent: Nov. 26, 2013

(54) NETWORK ACCESS METHOD, AUTHENTICATION METHOD, COMMUNICATIONS SYSTEMS AND RELEVANT DEVICES

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 289 days.

(21) Appl. No.: 12/883,394

(22) Filed: Sep. 16, 2010

(65) Prior Publication Data

US 2011/0002342 A1  Jan. 6, 2011

Related U.S. Application Data

(63) Continuation of application No. PCT/CN2009/071009, filed on Mar. 25, 2009.

(30) Foreign Application Priority Data

Mar. 26, 2008 (CN) .......................... 2008 1 0084076

(51) Int. Cl.
*H04L 12/28* (2006.01)
*H04L 12/56* (2011.01)

(52) U.S. Cl.
USPC .......................................................... 370/401

(58) Field of Classification Search
USPC .......................................................... 370/401
See application file for complete search history.

(56) References Cited

U.S. PATENT DOCUMENTS

| 2002/0162029 | A1 | 10/2002 | Allen et al. | |
|---|---|---|---|---|
| 2005/0220144 | A1 | 10/2005 | Ishiyama et al. | |
| 2007/0076607 | A1* | 4/2007 | Voit et al. | 370/230 |
| 2007/0277228 | A1 | 11/2007 | Curtis et al. | |
| 2007/0298760 | A1* | 12/2007 | Leis et al. | 455/404.1 |
| 2008/0205296 | A1* | 8/2008 | Zhang et al. | 370/254 |
| 2008/0244090 | A1* | 10/2008 | Zhu et al. | 709/242 |
| 2008/0270673 | A1* | 10/2008 | Sridhar et al. | 711/6 |
| 2008/0320111 | A1* | 12/2008 | Yan et al. | 709/220 |

(Continued)

FOREIGN PATENT DOCUMENTS

| CN | 1677981 | 10/2005 |
|---|---|---|
| CN | 1798158 | 7/2006 |
| CN | 101064648 | 10/2007 |
| EP | 1770940 A1 | 4/2007 |

OTHER PUBLICATIONS

Written Opinion of the International Searching Authority mailed Jul. 2, 2009 issued in corresponding International Patent Application No. PCT/CN2009/071009.

(Continued)

*Primary Examiner* — Farah Faroul
(74) *Attorney, Agent, or Firm* — Staas & Halsey LLP (57) ABSTRACT

A network access method, an authentication method, a communications system, and relevant devices are provided to support implicit authentication based on subscriber line information in Internet Protocol version 6 (IPv6). The network access method includes: receiving a first request message sent from a User Equipment (UE) on an Access Node (AN), where the first request message carries a Link-Local Address (LLA); obtaining subscriber line information corresponding to the UE; and sending a second request message from the AN to a Broadband Network Gateway (BNG), where the second request message carries the LLA and the subscriber line information and instructs the BNG to perform access authentication. An authentication method, a communications system and relevant devices are also disclosed.

16 Claims, 7 Drawing Sheets

(56) References Cited

U.S. PATENT DOCUMENTS

2009/0158388 A1* 6/2009 Sridhar et al. .................... 726/2
2009/0222537 A1* 9/2009 Watkins et al. ............... 709/221
2010/0290478 A1* 11/2010 Xia et al. ....................... 370/401
2012/0127975 A1* 5/2012 Yang et al. .................... 370/338

OTHER PUBLICATIONS

European Search Report dated Jul. 28, 2011 issued in corresponding European Patent Application No. 09725360.3.
Chinese Office Action mailed May 3, 2012 issued in corresponding Chinese Patent Application No. 200810084076.1.
$2^{nd}$ Chinese Office Action issued Dec. 31, 2012 in corresponding Chinese Patent application No. 200810084076.1 (8 pages) (8 pages English translation).
Architecture and Transport Working Group, "Working Text WT-146", Draft Version 2.6, Subscriber Sessions, Nov. 26, 2007, pp. 1-33.
European Office Action dated May 31, 2012 issued in corresponding European Patent Application No. 09725360.3.

* cited by examiner

NETWORK ACCESS METHOD, AUTHENTICATION METHOD, COMMUNICATIONS SYSTEMS AND RELEVANT DEVICES

CROSS-REFERENCE TO RELATED APPLICATIONS

This application is a continuation of International Application No. PCT/CN2009/071009, filed on Mar. 25, 2009, which claims priority to Chinese Patent Application No. 200810084076.1, filed on Mar. 26, 2008, both of which are hereby incorporated by reference in their entireties.

FIELD OF THE INVENTION

The present invention relates to the communications field, and in particular, to a network access method, an authentication method, a communications system, and relevant devices.

BACKGROUND OF THE INVENTION

The existing Digital Subscriber Line (DSL) network architecture evolves to the Internet Protocol (IP) Quality of Service (QoS)-enabled architecture based on Ethernet aggregation and connectivity. In this background, the general DSL reference architecture is shown in FIG. 1.

Figure 1:
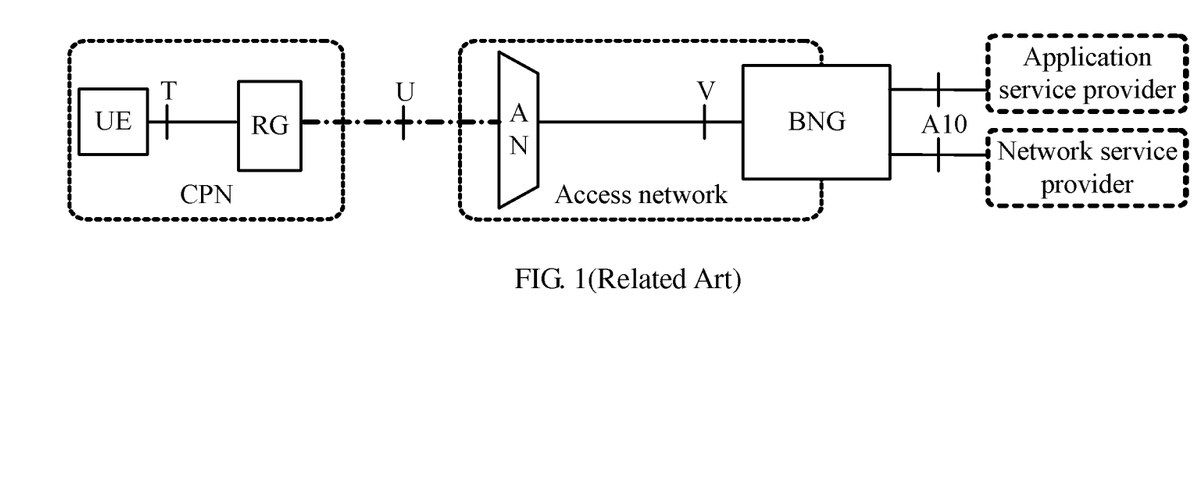
FIG. 1 shows DSL network architecture in the prior art.

In FIG. 1, T is a reference point between User Equipment (UE) and a Residential Gateway (RG) in a Customer Premises. Network (CPN); U is a reference point between the RG and an Access Node (AN) (namely, a Digital Subscriber Line Access Multiplexer (DSLAM)). In an access network, an aggregation network exists between the AN and a Broadband Remote Access Server (BRAS) or a Broadband Network Gateway (BNG), and V is an Ethernet aggregation reference point between the AN and the BRAS/BNG in the access network. A10 is a reference point between the access network and the service provider, and this reference point can connect an application service provider to a network service provider who owns the access network, or, in a roaming scenario, this reference point connects the network service provider to a visited access network. The CPN is interconnected with the access network through a DSL access technology. For a Passive Optical Network (PON), the AN is an Optical Line Termination (OLT) or an Optical Network Unit (ONU), and the CPN is interconnected with the access network through access technologies such as PON.

The DSL network architecture in the foregoing technical solution, however, supports only Internet Protocol version 4 (IPv4). With exhaustion of the IPv4 addresses, the DSL network architecture evolves to Internet Protocol version 6 (IPv6), which is an inevitable trend.

In IPv4, a Dynamic Host Configuration Protocol (DHCP) message carries subscriber line information to implement implicit user authentication. IPv6 may employ stateless address allocation. However, the prior art does not disclose how to implement implicit authentication based on subscriber line information in the case of stateless address allocation.

SUMMARY OF THE INVENTION

Embodiments of the present invention provide a network access method, an authentication method, a communications system, and relevant devices to support implicit authentication based on subscriber line information in IPv6.

A network access method provided in an embodiment of the present invention includes:

Receiving, on an AN, a first request message sent from a UE, where the first request message carries a Link-Local Address (LLA);

obtaining subscriber line information corresponding to the UE; and sending a second request message from the AN to a BNG, where the second request message carries the LLA and the subscriber line information and instructs the BNG to perform access authentication.

An authentication method provided in an embodiment of the present invention includes:

receiving a request message sent from an AN to a BNG, where the request message carries subscriber line information and an LLA;

sending an access request to an Authentication, Authorization and Accounting (AAA) server according to the subscriber line information; and receiving an authentication result returned by the AAA server, and detecting duplicate addresses for the LLA if the authentication result is authentication success, or sending a neighbor advertisement message to reject the LLA carried in the request message if the authentication result is authentication failure.

A communications system provided in an embodiment of the present invention includes:

an AN, configured to: receive a first request message sent by a UE, where the first request message carries an LLA, obtain subscriber line information corresponding to the UE, and send a second request message that carries the LLA and the subscriber line information to a BNG; and the BNG, configured to: receive the second request message from the AN, and send an access request to an AAA server according to the subscriber line information, where the access request instructs the AAA server to perform access authentication.

An AN provided in an embodiment of the present invention includes:

a receiving unit, configured to receive a first request message from a UE, where the first request message carries an LLA;

an obtaining unit, configured to obtain subscriber line information corresponding to the UE; and a sending unit, configured to send a second request message to a BNG, where the second request message carries the LLA and the subscriber line information and instructs the BNG to perform access authentication.

A BNG provided in an embodiment of the present invention includes:

a request receiving unit, configured to receive a request message from an AN, where the request message is a Neighbor Solicitation message and carries subscriber line information and an LLA;

an access request sending unit, configured to send an access request to an AAA server according to the subscriber line information;

an authentication result receiving unit, configured to: receive an authentication result sent by the AAA server, and trigger a proxy Duplicate Address Detection (DAD) unit to judge duplicate addresses if the authentication result is authentication success, or instruct the proxy DAD unit to send a neighbor advertisement message to reject the LLA configured by the user if the authentication result is authentication failure; and the proxy DAD unit, configured to judge whether any address in an address cache matches the LLA in the Neighbor Solicitation message.

A network access method provided in an embodiment of the present invention is applied to IPv6 and the method includes:

receiving a first request message sent from a UE to an AN, where the first request message is a first Neighbor Solicitation message or a first router solicitation message;

obtaining subscriber line information corresponding to the UE; and sending a second request message from the AN to a BNG, where the second request message carries the subscriber line information and is a second Neighbor Solicitation message or a second router solicitation message.

The foregoing technical solution shows that the embodiments of the present invention bring the following benefits:

In the embodiments of the present invention, the AN receives the first request message that carries an LLA from the UE, obtains the subscriber line information corresponding to the UE, and adds the subscriber line information to the second request message and sends the second request message to the BNG. In this way, the BNG can perform implicit authentication for the user according to the subscriber line information. Therefore, the embodiments of the present invention support implicit authentication based on subscriber line information in the case of IPv6.

DETAILED DESCRIPTION OF THE EMBODIMENTS

The embodiments of the present invention provide a network access method, an authentication method, a communications system, and relevant devices to support implicit authentication based on subscriber line information in IPv6.

A network access method provided in an embodiment of the present invention includes:

Receiving, on an AN, a first request message from a UE, where the first request message carries an LLA;

obtaining subscriber line information corresponding to the UE according to the first request message; and sending a second request message from the AN to a BNG, where the second request message carries the LLA and the subscriber line information and instructs the BNG to perform access authentication for the UE.

In practical applications, the first request message and the second request message may be Neighbor Solicitation messages, or router solicitation messages, or other types of request message. In this embodiment and subsequent embodiments, it is assumed that the first request message and the second request message are Neighbor Solicitation messages, which, however, shall not be construed as a limitation to the present invention.

In this embodiment, the AN receives the first Neighbor Solicitation message that carries the LLA from the UE, obtains the subscriber line information corresponding to the UE, and adds the subscriber line information to the second Neighbor Solicitation message and sends the second Neighbor Solicitation message to the BNG to instruct the BNG to perform access authentication. Therefore, this embodiment supports implicit authentication based on subscriber line information in the case of IPv6.

In the network access process in this embodiment, the access authentication function is provided. The process of access authentication is classified into two processes:

I. LLA Processing:

In this embodiment, an LLA relay/proxy function is integrated in the AN. That is, when receiving a message that carries an LLA from the UE, the AN obtains the subscriber line information corresponding to the UE, and sends the obtained subscriber line information and LLA to the BNG for access authentication.

Figure 2:
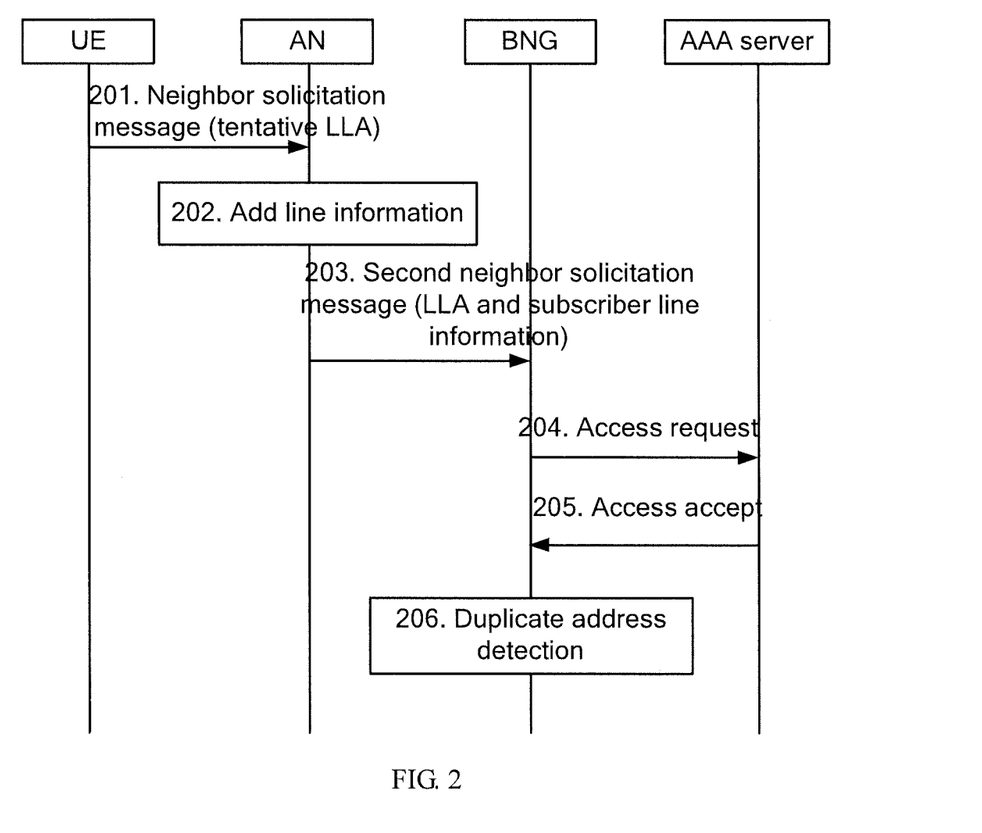
FIG. 2 is a flowchart of an authentication method in an embodiment of the present invention.

Specifically, according to the combination mode of the LLA and the subscriber line information, this mode is classified into the following two types:

A. The LLA and the subscriber line information are set in different positions or different fields of the same message for transmission. That is, the LLA is set in the LLA field that carries the LLA, and the subscriber line information is set in a field other than the LLA field:

As shown in FIG. 2, an authentication process in an embodiment of the present invention includes:

201. The UE sends a first Neighbor Solicitation message to the AN.

In this embodiment, the UE configures the LLA automatically in a preset mode. The configuration process is covered in the prior art, and thus is not further detailed here.

After completing the configuration of the LLA, the UE sends a first Neighbor Solicitation request to the AN. The message carries a tentative LLA. The UE automatically configures the tentative LLA according to preset configuration rules.

202. The AN adds line information to the first Neighbor Solicitation message.

The AN supports the LLA relay function. That is, the AN in this embodiment does not modify the tentative LLA, but only forwards it. When forwarding the tentative LLA, the AN forwards the subscriber line information together. Therefore, after obtaining the message, the AN queries the subscriber line information corresponding to the current UE. The subscriber line information identifies the line used by the user, and the subscriber line information may be a physical port identifier and/or a logical port identifier for host access, or another identifier capable of identifying the line used by the user.

In this embodiment, the tentative LLA and the subscriber line information are set in different positions or different fields of the same message for transmission. After obtaining the subscriber line information, the AN adds the subscriber line information to reserved bits or options of the first Neighbor Solicitation message to obtain the second Neighbor Solicitation message. That is, the second Neighbor Solicitation message carries the tentative LLA and the subscriber line information.

It is understandable that in this embodiment, the AN may add the subscriber line information to another position of the first Neighbor Solicitation message so long as the second Neighbor Solicitation message carries the subscriber line information. The specific position is not limited herein.

203. The AN sends the second Neighbor Solicitation message that carries the tentative LLA and the subscriber line information to the BNG.

After adding the subscriber line information to the first Neighbor Solicitation message to obtain the second Neighbor Solicitation message, the AN sends the second Neighbor Solicitation message to the BNG or BRAS.

It should be noted that the BNG mentioned in this embodiment and subsequent embodiments refers to the BNG and/or BRAS.

204. The BNG sends an access request to the AAA server.

In this embodiment, the BNG sends an access request to the AAA server according to the subscriber line information in the second Neighbor Solicitation message. The access request carries information about the subscriber line. Specifically:

The BNG sends an access request that carries subscriber line information to the AAA server, and the access request instructs the AAA server to authenticate the subscriber line information.

Or the BNG obtains the corresponding username and password according to the subscriber line information, and sends an access request that carries the username and password to the AAA server, and the access request instructs the AAA server to authenticate the username and password.

205. The AAA server performs authentication according to the access request, and returns an authentication result to the BNG.

In this embodiment, if the access request received by the AAA server carries subscriber line information, the AAA server authenticates the subscriber line information and returns an authentication result to the BNG; if the access request received by the AAA server carries a username and a password, the AAA server authenticates the username and password and returns an authentication result to the BNG. The authentication result can be authentication success or authentication failure.

If the authentication succeeds, the AAA server delivers a user service profile to the BNG for subsequent data communications.

206. The BNG detects duplicate addresses according to the authentication result returned by the AAA server.

In this embodiment, the BNG supports proxy DAD, and sets up and maintains an IP address cache of the represented user.

If the authentication result received by the BNG is authentication success, the BNG performs proxy DAD, that is, the BNG compares the obtained tentative LLA with the addressed stored in the preset address cache and judges whether any address in the address cache matches the tentative LLA. If any address in the address cache matches the tentative LLA, the BNG determines that an address conflict occurs, and sends a neighbor advertisement message in place of the owner of the matched address, or performs other exception handling processes. If no address in the address cache matches the tentative LLA, the BNG determines that no address conflict occurs, and adds the tentative LLA to the address cache.

If the authentication result received by the BNG is authentication failure, it is determined that an address conflict occurs. In such case, the BNG sends a neighbor advertisement message to the UE to reject the tentative LLA carried in the second request message and configured by the UE automatically.

It should be noted that in this embodiment, step 206 may be performed before the user authentication process (namely, before step 204 and step 205). That is, after step 203, the BNG compares the obtained tentative LLA with the addresses stored in the preset address cache and judges whether any address in the address cache matches the tentative LLA. If any address in the address cache matches the tentative LLA, the BNG determines that an address conflict occurs, and sends a neighbor advertisement message in place of the owner of the matched address, or performs other exception handling processes. If no address in the address cache matches the tentative LLA, the BNG determines that no address conflict occurs, and adds the tentative LLA to the address cache, and triggers the user authentication process, namely, step 204 and step 205.

Figure 3:
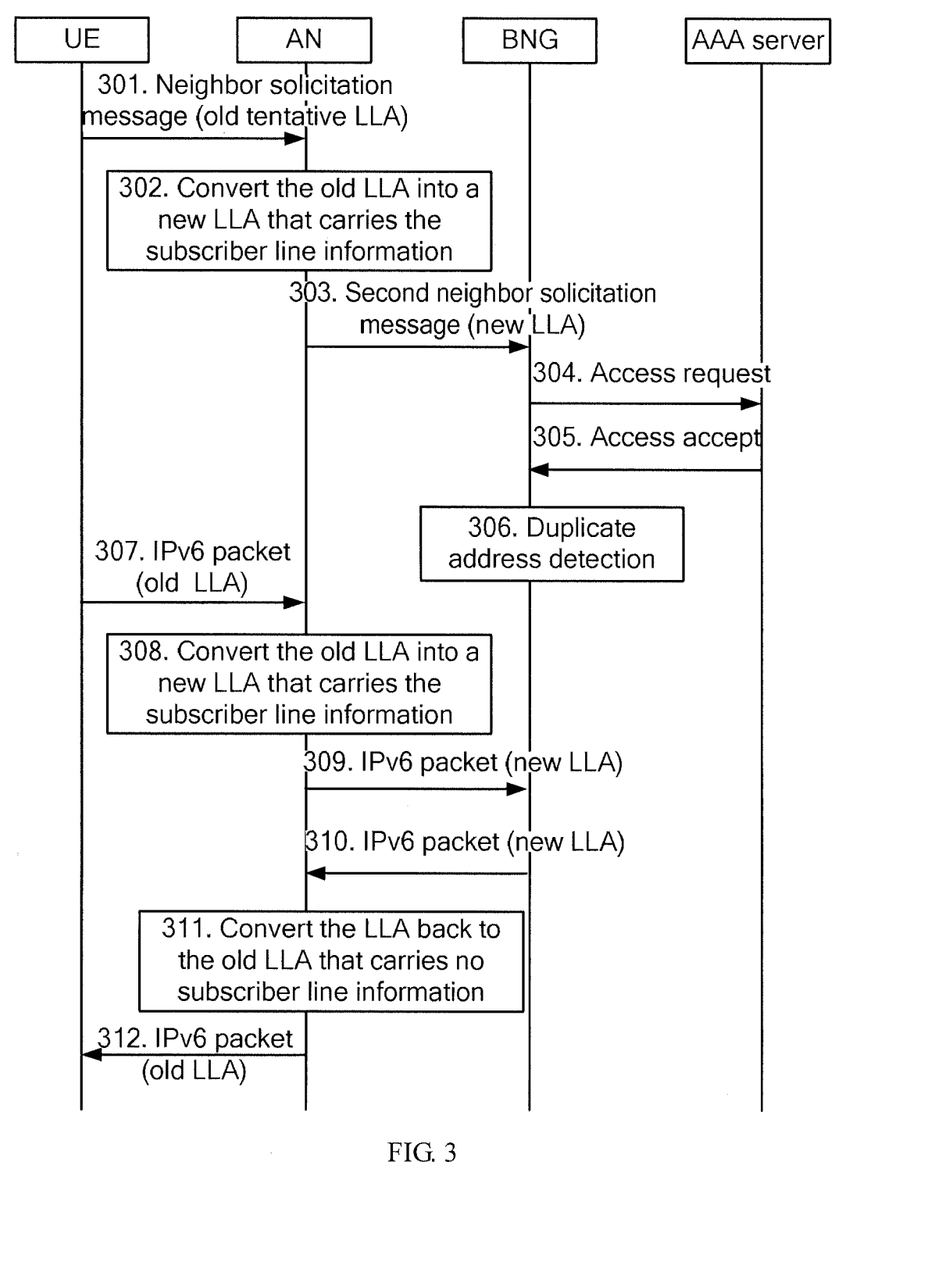
FIG. 3 is a flowchart of an authentication method in another embodiment of the present invention.

The foregoing embodiment deals with the scenario in which the LLA and the subscriber line information are in different positions or different fields of the same message for transmission. Described below is another scenario:

B. The subscriber line information is added to an LLA for transmission:

As shown in FIG. 3, an authentication process in another embodiment of the present invention includes:

301. The UE sends a first Neighbor Solicitation message to the AN.

In this embodiment, the UE configures the LLA automatically in a preset mode. The configuration process is covered in the prior art, and thus is not further detailed here.

After completing the configuration of the LLA, the UE sends a first Neighbor Solicitation request to the AN. The message carries a tentative LLA. The tentative LLA is configured automatically by the UE according to preset configuration rules.

302. The AN modifies the tentative LLA.

The AN supports the LLA proxy function. That is, in this embodiment, the AN modifies the received tentative LLA, and adds the subscriber line information to the tentative LLA.

After obtaining the message, the AN queries the subscriber line information corresponding to the current UE. The subscriber line information identifies the line used by the user, and may be a physical port identifier and/or a logical port identifier for host access, or another identifier capable of identifying the line used by the user.

In this embodiment, the subscriber line information is added to the tentative LLA of the second Neighbor Solicitation message for transmission. Specifically, after obtaining the subscriber line information, the AN adds the subscriber line information to all or partial bits of the interface identifier field of the tentative LLA, or the subscriber line information occupies the entire or part of the 54-bit field in the tentative LLA.

The structure of the tentative LLA of IPv6 is shown in Table 1:

TABLE 1

| 10 Bits | 54 Bits | 64 Bits |
| --- | --- | --- |
| 1111 1110 10 | 0 | Interface identifier |

It is understandable that in this embodiment, the AN may add the subscriber line information to another position of the tentative LLA so long as the tentative LLA carries the subscriber line information. The specific position is not limited herein.

303. The AN sends the second Neighbor Solicitation message to the BNG.

In this embodiment, the second Neighbor Solicitation message carries a tentative LLA that carries the subscriber line information.

304. The BNG sends an access request to the AAA server.

In this embodiment, the BNG sends an access request to the AAA server according to the subscriber line information in the second Neighbor Solicitation message. The access request carries information about the subscriber line. Specifically:

The BNG sends an access request that carries subscriber line information to the AAA server, and the access request instructs the AAA server to authenticate the subscriber line information.

Or the BNG obtains the corresponding username and password according to the subscriber line information, and sends an access request that carries the username and password to the AAA server, and the access request instructs the AAA server to authenticate the username and password.

305. The AAA server performs authentication according to the access request, and returns an authentication result to the BNG.

In this embodiment, if the access request received by the AAA server carries subscriber line information, the AAA server authenticates the subscriber line information and returns an authentication result to the BNG; if the access request received by the AAA server carries a username and a password, the AAA server authenticates the username and password and returns an authentication result to the BNG. The authentication result may be authentication success or authentication failure.

If the authentication succeeds, the AAA server delivers a user service profile to the BNG for subsequent data communications.

306. The BNG detects duplicate addresses according to the authentication result returned by the AAA server.

In this embodiment, the BNG supports proxy DAD, and sets up and maintains an IP address cache of the represented user.

If the authentication result received by the BNG is authentication success, the BNG performs proxy DAD, that is, the BNG compares the obtained tentative LLA that carries the subscriber line information with the addresses stored in the preset address cache and judges whether any address in the address cache matches the tentative LLA. If any address in the address cache matches the tentative LLA, the BNG determines that an address conflict occurs, and sends a neighbor advertisement message in place of the owner of the matched address, or performs other exception handling processes. If no address in the address cache matches the tentative LLA, the BNG determines that no address conflict occurs, and adds the tentative LLA that carries the subscriber line information to the address cache.

If the authentication result received by the BNG is authentication failure, it is determined that an address conflict occurs. In such case, the BNG sends a neighbor advertisement message to the UE to reject the tentative LLA carried in the second Neighbor Solicitation message and configured by the UE automatically.

It should be noted that in this embodiment, step 306 may be performed before the user authentication process (namely, before step 304 and step 305). That is, after step 303, the BNG compares the obtained tentative LLA with the addresses stored in the preset address cache and judges whether any address in the address cache matches the tentative LLA. If any address in the address cache matches the tentative LLA, the BNG determines that an address conflict occurs, and sends a neighbor advertisement message in place of the owner of the matched address, or performs other exception handling processes. If no address in the address cache matches the tentative LLA, the BNG determines that no address conflict occurs, and adds the tentative LLA that carries the subscriber line information to the address cache, and triggers the user authentication process, namely, step 304 and step 305.

307. The UE sends an IPv6 packet that carries the LLA to the AN. The IPv6 packet carries no subscriber line information.

In this embodiment, the LLA in the IPv6 packet sent by the UE to the AN carries no subscriber line information.

308. The AN modifies the LLA so that the modified LLA carries the subscriber line information.

The modification mode may be: The AN adds the subscriber line information to the LLA of the IPv6 packet. The adding mode is similar to the adding mode in step 302 above, and is not further described.

309-310. The AN exchanges the IPv6 packet that carries the new LLA with the BNG.

311. The AN modifies the LLA that carries the subscriber line information in the IPv6 packet sent by the BNG so that the LLA carries no subscriber line information.

312. The AN sends the IPv6 packet that carries the LLA to the UE, and this LLA carries no subscriber line information.

In this embodiment, the AN modifies the information in the LLA; when interacting with the BNG the AN adds the subscriber line information to the LLA; when interacting with the UE, the AN changes the LLA back to the LLA that carries no subscriber line information.

It should be noted that in the foregoing embodiment, steps 307-312 are optional.

Described above is LLA processing. In practical applications, after the LLA is processed, the global IPv6 address may be processed, which includes access authentication and address allocation:

II. Global IPv6 Address Processing:

In this embodiment, a Prefix Discovery (PD) relay/proxy function is integrated in the AN. When receiving a message that carries an on-link prefix from the UE, the AN obtains the subscriber line information corresponding to the UE, and sends the obtained subscriber line information to the BNG for performing access authentication and global IPv6 address allocation.

It should be noted that in this embodiment, the PD relay is integrated in the AN, which means that, if the AN discovers that the router solicitation message sent by the UE carries the on-link prefix of the user, the AN obtains the line information corresponding to the UE, and sends the on-link prefix and the obtained subscriber line information to the BNG for performing access authentication and global IPv6 address allocation, but the AN does not modify the on-link prefix.

Or in this embodiment, the PD relay is integrated in the AN, which means that, if the AN discovers that the router solicitation message sent by the UE carries the on-link prefix of the user, the AN obtains the line information corresponding to the UE, and sends the on-link prefix and the obtained subscriber line information to the BNG for performing access authentication and global IPv6 address allocation, and at the same time, the AN modifies the on-link prefix, for example, adds the subscriber line information to the on-link prefix.

Figure 4:
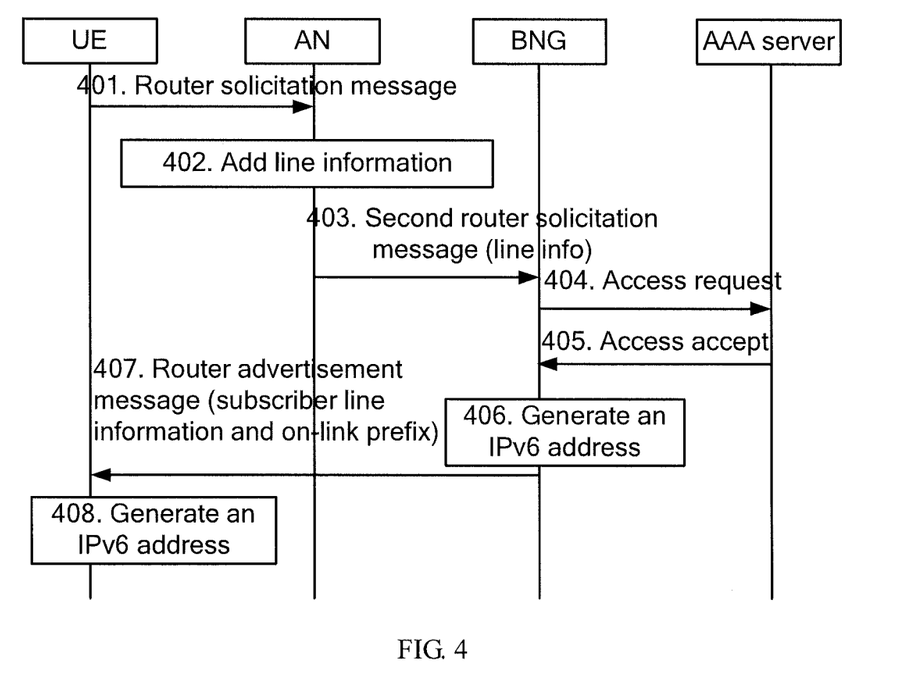
FIG. 4 is a flowchart of an authentication method in an embodiment of the present invention.

Specifically, according to whether the AN participates in conversion of the on-link prefix, this mode is classified into the following two types:

A. The AN does not participate in conversion of the on-link prefix, but supports the PD relay function:

As shown in FIG. 4, an authentication process in another embodiment of the present invention includes:

401. The UE sends a first router solicitation message to the AN.

In this embodiment, the UE sends the first router solicitation message to request the BNG to return a router advertisement message, so as to learn the on-link prefix.

In this embodiment, the first router solicitation message carries the on-link prefix of the user.

402. The AN adds the subscriber line information to obtain the second router solicitation message that carries the subscriber line information.

Because the AN supports the PD relay function, the AN queries the subscriber line information corresponding to the current UE after receiving the first router solicitation message. The subscriber line information identifies the line used by the user, and may be a physical port identifier and/or a logical port identifier for host access, or another identifier capable of identifying the line used by the user.

In this embodiment, after obtaining the subscriber line information, the AN adds the subscriber line information and the on-link prefix to reserved bits or options of the first router solicitation message to obtain the second router solicitation message. That is, the second router solicitation message carries the subscriber line information and the on-link prefix.

It is understandable that in this embodiment, the AN may add the subscriber line information to other positions of the first router solicitation message, and the specific positions are not limited.

403. The AN sends the second router solicitation message that carries the subscriber line information to the BNG.

404. The BNG sends an access request to the AAA server.

In this embodiment, the BNG sends an access request to the AAA server according to the subscriber line information in the second router solicitation message. The access request carries information about the subscriber line. Specifically:

The BNG sends an access request that carries subscriber line information to the AAA server, and the access request instructs the AAA server to authenticate the subscriber line information.

Or the BNG obtains the corresponding username and password according to the subscriber line information, and sends an access request that carries the username and password to the AAA server, and the access request instructs the AAA server to authenticate the username and password.

405. The AAA server performs authentication according to the access request, and returns an authentication result to the BNG.

In this embodiment, if the access request received by the AAA server carries subscriber line information, the AAA server authenticates the subscriber line information and returns an authentication result to the BNG; if the access request received by the AAA server carries a username and a password, the AAA server authenticates the username and password and returns an authentication result to the BNG. The authentication result may be authentication success or authentication failure.

If the authentication fails, the BNG rejects to return the on-link prefix to the user, and does not generate the global IPv6 address of the user.

If the authentication succeeds, the AAA server delivers a user service profile to the BNG for subsequent data communications, and triggers subsequent steps.

406. The BNG generates a global IPv6 address that carries the subscriber line information.

In this embodiment, the BNG may generate the global IPv6 address in three modes:

(1) The BNG retrieves an interface identifier from the LLA applied in the previous LLA processing (the LLA carries the subscriber line information, as described in the embodiment shown in FIG. 3), and appends the interface identifier that carries the subscriber line information to the on-link prefix of the user to generate the global IPv6 address of the user;

(2) The BNG retrieves an interface identifier from the LLA applied in the previous LLA processing (the LLA carries no subscriber line information, as described in the embodiment shown in FIG. 2), obtains the subscriber line information from the second router solicitation message, combines the subscriber line information with the interface identifier and appends them to the on-link prefix of the user to generate the global IPv6 address of the user; and (3) The BNG retrieves an interface identifier from the LLA applied in the previous LLA processing (the LLA carries no subscriber line information, as described in the embodiment shown in FIG. 2), obtains the subscriber line information from the second router solicitation message, uses the subscriber line information as a part of the on-link prefix, and appends the interface identifier to the user's on-link prefix that carries the line information to generate the global IPv6 address of the user.

It should be noted that the three modes above are only examples of the process of generating a global IPv6 address according to the embodiments of the present invention. In practical applications, the foregoing information may also be combined in any way to generate a global IPv6 address, and the generation mode is not limited.

407. The BNG sends a router advertisement message to the UE through the AN, where the router advertisement message carries the on-link prefix that carries the subscriber line information.

Specifically, according to the mode of generating the address in step 406, the position of the subscriber line information in this step varies. For mode (1) and mode (2) in step 406, the subscriber line information is added to the reserved bits or options of the router advertisement message.

For mode (3) in step 406, the subscriber line information is added to the on-link prefix.

In this embodiment, the AN does not participate in the conversion of the on-link prefix, and therefore, the router advertisement message sent by the BNG is forwarded to the UE directly.

408. The UE configures the global IPv6 address that carries the subscriber line information automatically.

After receiving the router advertisement message sent by the BNG, the UE generates a global IPv6 address according to the subscriber line information, interface identifier, and on-link prefix. The generation process is similar to the process of the BNG generating the global IPv6 address in step 406, and corresponds to the mode of the BNG generating the global IPv6 address.

The scenario in which the AN does not participate in the conversion of the on-link prefix is described above. The following describes the scenario in which the AN participates in the conversion of the on-link prefix.

Figure 5:
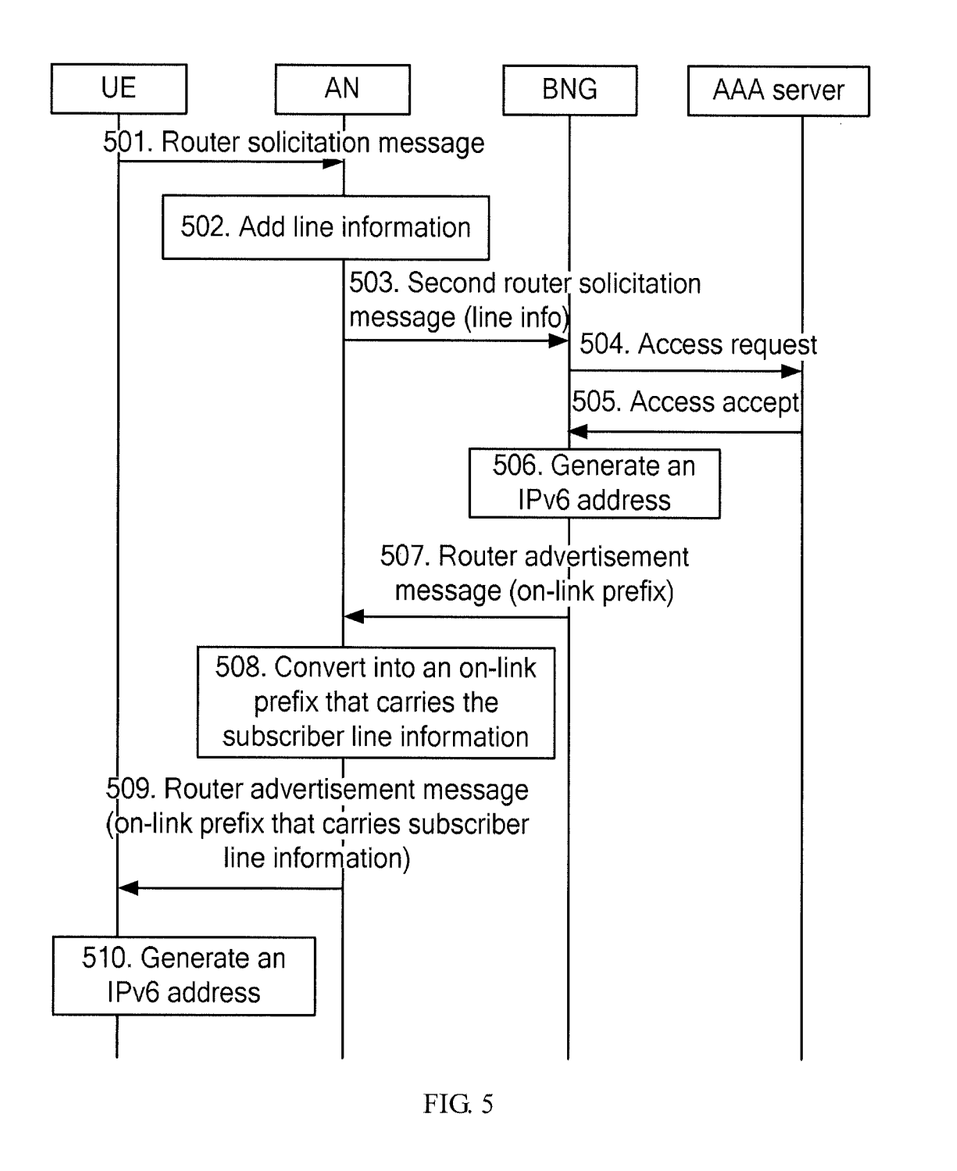
FIG. 5 is a flowchart of an authentication method in an embodiment of the present invention.

B. The AN participates in the conversion of the on-link prefix, and supports the PD proxy function:

As shown in FIG. 5, an authentication process in another embodiment of the present invention includes:

501. The UE sends a first router solicitation message to the AN.

In this embodiment, the UE sends the first router solicitation message to request the BNG to return a router advertisement message, so as to learn the on-link prefix.

In this embodiment, the first router solicitation message carries the on-link prefix of the user.

502. The AN adds the subscriber line information.

Because the AN supports the PD proxy function, the AN queries the subscriber line information corresponding to the current UE after receiving the first router solicitation message. The subscriber line information may be a physical port identifier and/or a logical port identifier for host access, or another identifier capable of identifying the line used by the user.

In this embodiment, after obtaining the subscriber line information, the AN adds the subscriber line information and the on-link prefix to reserved bits or options of the first router solicitation message to obtain the second router solicitation message. That is, the second router solicitation message carries the subscriber line information and the on-link prefix.

It is understandable that in this embodiment, the AN may add the subscriber line information to other positions of the first router solicitation message, and the specific positions are not limited.

503. The AN sends the second router solicitation message that carries the subscriber line information to the BNG.

504. The BNG sends an access request to the AAA server.

In this embodiment, the BNG sends an access request to the AAA server according to the subscriber line information in the second router solicitation message. The access request carries information about the subscriber line. Specifically:

The BNG sends an access request that carries subscriber line information to the AAA server, and the access request instructs the AAA server to authenticate the subscriber line information.

Or the BNG obtains the corresponding username and password according to the subscriber line information, and sends an access request that carries the username and password to the AAA server, and the access request instructs the AAA server to authenticate the username and password.

505. The AAA server performs authentication according to the access request, and returns an authentication result to the BNG.

In this embodiment, if the access request received by the AAA server carries subscriber line information, the AAA server authenticates the subscriber line information and returns an authentication result to the BNG; if the access request received by the AAA server carries a username and a password, the AAA server authenticates the username and password and returns an authentication result to the BNG. The authentication result may be authentication success or authentication failure.

If the authentication fails, the BNG rejects to return the on-link prefix to the user, and does not generate the global IPv6 address of the user.

If the authentication succeeds, the AAA server delivers a user service profile to the BNG for subsequent data communications, and triggers subsequent steps.

506. The BNG generates a global IPv6 address that carries the subscriber line information.

In this embodiment, the BNG may generate the global IPv6 address in three modes:

(1) The BNG retrieves an interface identifier from the LLA applied in the previous LLA processing (the LLA carries the subscriber line information, as described in the embodiment shown in FIG. 3), and appends the interface identifier that carries the subscriber line information to the on-link prefix of the user to generate the global IPv6 address of the user;

(2) The BNG retrieves an interface identifier from the LLA applied in the previous LLA processing (the LLA carries no subscriber line information, as described in the embodiment shown in FIG. 2), obtains the subscriber line information from the second router solicitation message, combines the subscriber line information with the interface identifier and appends them to the on-link prefix of the user to generate the global IPv6 address of the user; and (3) The BNG retrieves an interface identifier from the LLA applied in the previous LLA processing (the LLA carries no subscriber line information, as described in the embodiment shown in FIG. 2), obtains the subscriber line information from the second router solicitation message, uses the subscriber line information as a part of the on-link prefix, and appends the interface identifier to the user's on-link prefix that carries the line information to generate the global IPv6 address of the user.

It should be noted that the three modes above are only examples of the process of generating a global IPv6 address according to the embodiments of the present invention. In practical applications, the foregoing information may be combined in any way to generate a global IPv6 address. The generation mode is not limited.

507. The BNG sends a router advertisement message that carries the on-link prefix to the AN.

508. The AN converts the on-link prefix in the router advertisement message into the on-link prefix that carries the subscriber line information.

In this embodiment, the AN participates in the conversion of the on-link prefix, and therefore, the AN adds the obtained subscriber line information to the received on-link prefix to obtain the on-link prefix that carries the subscriber line information.

509. The AN sends the on-link prefix that carries the subscriber line information to the UE.

After adding the subscriber line information to the on-link prefix to obtain the on-link prefix that carries the subscriber line information, the AN adds the on-link prefix that carries the subscriber line information to the router advertisement message, and sends the router advertisement message to the UE.

510. The UE configures the global IPv6 address that carries the subscriber line information automatically.

After receiving the router advertisement message sent by the AN, the UE generates a global IPv6 address according to the subscriber line information, interface identifier, and on-link prefix. The generation process is similar to the process of the BNG generating the global IPv6 address in step 506, and corresponds to the mode of the BNG generating the global IPv6 address.

In this embodiment, the AN receives the first Neighbor Solicitation message or first router solicitation message from the UE, obtains the subscriber line information corresponding to the UE, and adds the subscriber line information to the second Neighbor Solicitation message or second router solicitation message and sends the message to the BNG. In this way, the BNG can perform implicit authentication for the user according to the subscriber line information. Therefore, this embodiment of the present invention supports implicit authentication based on subscriber line information in the case of IPv6.

In the process of processing the global IPv6 address, the BNG and the UE may generate the global IPv6 address according to the subscriber line information. Therefore, the technical solution in this embodiment implements the address allocation and access authentication in IPv6 architecture.

Figure 6:
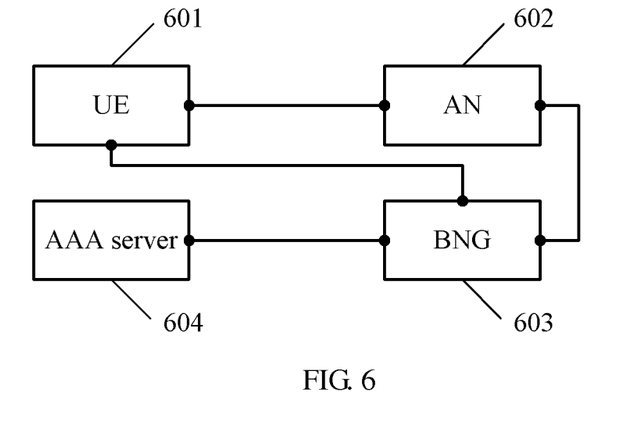
FIG. 6 shows a communications system in an embodiment of the present invention.

The following describes a communications system provided in an embodiment of the present invention. As shown in FIG. 6, the communications system in an embodiment of the present invention includes a UE 601, an AN 602, a BNG 603, and an AAA server 604.

The UE 601 is configured to send a first request message to the AN 602, where the first request message may be a first Neighbor Solicitation message that carries an LLA.

The AN 602 is configured to: receive the Neighbor Solicitation message sent by the UE 601, where the Neighbor Solicitation message carries the LLA, obtain subscriber line information corresponding to the UE 601, and send a second Neighbor Solicitation message that carries the LLA and the subscriber line information to the BNG 603.

Specifically, the AN 602 may use an LLA relay processing mode or an LLA proxy processing mode to send the second Neighbor Solicitation message that carries the LLA and the subscriber line information to the BNG 603:

In LLA relay processing mode, the AN 602 adds the LLA and the subscriber line information to different positions or different fields of the second Neighbor Solicitation message, and sends the second Neighbor Solicitation message to the BNG 603.

In LLA proxy processing mode, the AN 602 converts the LLA inclusive of no subscriber line information into the LLA inclusive of the subscriber line information, adds the LLA inclusive of the subscriber line information to the second Neighbor Solicitation message, and sends the second Neighbor Solicitation message to the BNG 603.

The BNG 603 is configured to: receive the second Neighbor Solicitation message sent by the AN 602, and send an access request to the AAA server 604 according to the subscriber line information.

In this embodiment, after receiving an authentication result returned by the AAA server 604, the BNG 603 detects duplicate addresses for the LLA if the authentication result is authentication success, or sends a neighbor advertisement message to reject the LLA carried in the second Neighbor Solicitation message and configured by the user if the authentication result is authentication failure.

The AAA server 604 is configured to perform access authentication according to the access request sent by the BNG 603.

Described above is an LLA processing process. In a global IPv6 address processing process, the access authentication system may further include:

a second AN, configured to: receive the router solicitation message sent by the UE 601, perform PD relay operations, and send a second router solicitation message that carries the subscriber line information to the BNG 603; and a second BNG, configured to: receive the second router solicitation message, and send an access request to the AAA server 604 according to the subscriber line information in the second router solicitation message.

The functions of the second AN above can be implemented in the AN 602; and the functions of the second BNG above can be implemented in the BNG 603.

It should be noted that when the subscriber line information is carried in the LLA, the AN 602 is further configured to convert the LLA sent by the UE 601 and inclusive of no subscriber line information into the LLA inclusive of the subscriber line information, and convert the LLA sent by the BNG 603 and inclusive of the subscriber line information into the LLA inclusive of no subscriber line information.

It should be noted that in processing the global IPv6 address, the BNG 603 is further configured to generate a global IPv6 address according to the subscriber line information, the on-link prefix corresponding to the UE, and/or the interface identifier. The generation process is detailed in the method embodiment above.

Figure 7:
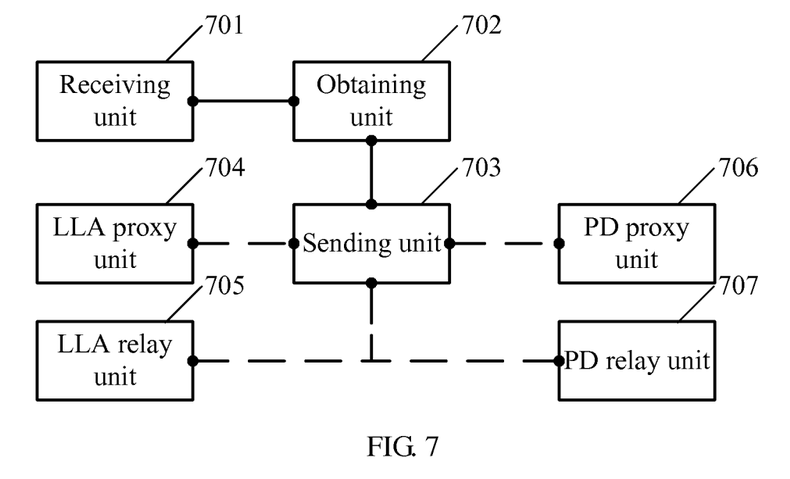
FIG. 7 shows an AN in an embodiment of the present invention.

As shown in FIG. 7, an AN provided in an embodiment of the present invention includes:

a receiving unit 701, configured to receive a first request message sent by the UE, where the first request message may be a Neighbor Solicitation message or a router solicitation message, and the first request message (such as the Neighbor Solicitation message) may carry an LLA;

an obtaining unit 702, configured to obtain subscriber line information corresponding to the UE; and a sending unit 703, configured to send a second request message to a BNG, where the second request message carries the subscriber line information and instructs the BNG to perform access authentication; the first request message and the second request message may be Neighbor Solicitation messages, or second router solicitation messages. The subscriber line information and the LLA (or on-link prefix) may be set in different fields of the same message, or in the same field such as the LLA field.

The AN in this embodiment may further include:

an LLA proxy unit 704, configured to: convert the LLA carried in the first request message into the LLA that carries the subscriber line information, and set the LLA that carries the subscriber line information into the second request message; and convert the LLA sent by the BNG and inclusive of the subscriber line information into the LLA inclusive of no subscriber line information;

and/or, an LLA relay unit 705, configured to: add the LLA in the first request message and the subscriber line information obtained by the obtaining unit to different positions or different fields of the second request message, namely, the LLA field and a field other than the LLA field.

In this embodiment, the receiving unit 701 is further configured to receive the first router solicitation message sent by the UE, where the first router solicitation message carries an on-link prefix which is an identifier of the on-link prefix corresponding to the UE.

The sending unit 703 is further configured to send the second router solicitation message that carries the on-link prefix and the subscriber line information to the BNG.

The AN in this embodiment may further include:

a PD proxy unit 706, configured to: add subscriber line information to the on-link prefix sent by the BNG, and send the on-link prefix that carries the subscriber line information to the UE;

and/or a PD relay unit 707, configured to forward the on-link prefix sent by the BNG and inclusive of the subscriber line information to the UE.

Figure 8:
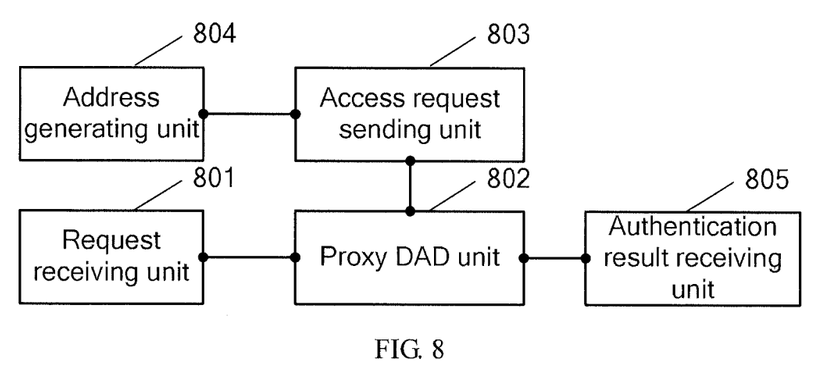
FIG. 8 shows a BNG in an embodiment of the present invention.

As shown in FIG. 8, a BNG provided in an embodiment of the present invention includes:

a request receiving unit 801, configured to: receive a second request message sent by an AN and inclusive of the subscriber line information, where the second request message may be a second Neighbor Solicitation message and/or a second router solicitation message, and may further carry an LLA;

an access request sending unit 803, configured to send an access request to an AAA server according to the subscriber line information;

an authentication result receiving unit 805, configured to: receive an authentication result sent by the AAA server, and trigger a proxy DAD unit 802 to detect duplicate addresses if the authentication result is authentication success, or instruct the proxy DAD unit 802 to send a neighbor advertisement message to reject the LLA configured by the user if the authentication result is authentication failure; and the proxy DAD unit 802, configured to judge whether any address in an address cache matches the LLA in the Neighbor Solicitation message.

In practical applications, the proxy DAD unit 802 may perform corresponding operations as triggered by the authentication result receiving unit 805. Specifically:

If the authentication result received by the authentication result receiving unit 805 from the AAA server is authentication success, the authentication result receiving unit 805 triggers the proxy DAD unit 802 to detect duplicate addresses. That is, the proxy DAD unit 802 compares the obtained LLA with the addresses stored in the preset address cache and judges whether any address in the address cache matches the LLA. If any address in the address cache matches the LLA, the proxy DAD unit 802 determines that an address conflict occurs, and sends a neighbor advertisement message in place of the owner of the matched address, or performs other exception handling processes. If no address in the address cache matches the LLA, the proxy DAD unit 802 determines that no address conflict occurs, and adds the LLA carried in the Neighbor Solicitation message to the address cache.

If the authentication result received by the authentication result receiving unit 805 from the AAA server is authentication failure, the authentication result receiving unit 805 notifies the proxy DAD unit 802 to send a neighbor advertisement message to the UE. That is, the proxy DAD unit 802 may deem that an address conflict occurs, namely, send a neighbor advertisement message to the UE to reject the LLA automatically configured by the UE.

In the process described above, the authentication result receiving unit 805 controls the proxy DAD unit 802 to perform the corresponding operations according to the authentication result returned by the AAA server. In practical applications, the operation of detecting duplicate addresses may be performed before the authentication is initiated, that is, the proxy DAD unit 802 is configured to judge whether any address in the address cache matches the LLA in the Neighbor Solicitation message. If any address in the address cache matches the LLA, the proxy DAD unit 802 determines that an address conflict occurs, and sends a neighbor advertisement message in place of the owner of the matched address, or performs other exception handling processes. If no address in the address cache matches the LLA, the proxy DAD unit 802 determines that no address conflict occurs, and controls the access request sending unit 803 to send an access request to the AAA server according to the subscriber line information. In this case, the authentication result receiving unit 805 is only configured to receive the authentication result returned by the AAA server after the access request sending unit 803 sends the access request to the AAA server.

The request receiving unit 801 is further configured to receive the router solicitation message that carries the on-link prefix and the subscriber line information. The BNG in this embodiment may further include:

an address generating unit 804, configured to allocate the address according to the on-link prefix, subscriber line information, and preset interface identifier.

In this embodiment, the address generating unit 804 may generate the global IPv6 address in the following three modes but without limitation to the following three modes:

(1) The BNG retrieves an interface identifier from the LLA applied in the previous LLA processing (the LLA carries the subscriber line information, as described in the embodiment shown in FIG. 3), and appends the interface identifier that carries the subscriber line information to the on-link prefix of the user to generate the global IPv6 address of the user;

(2) The BNG retrieves an interface identifier from the LLA applied in the previous LLA processing (the LLA carries no subscriber line information, as described in the embodiment shown in FIG. 2), obtains the subscriber line information from the second router solicitation message, combines the subscriber line information with the interface identifier and appends them to the on-link prefix of the user to generate the global IPv6 address of the user; and (3) The BNG retrieves an interface identifier from the LLA applied in the previous LLA processing (the LLA carries no subscriber line information, as described in the embodiment shown in FIG. 2), obtains the subscriber line information from the second router solicitation message, uses the subscriber line information as a part of the on-link prefix, and appends the interface identifier to the user's on-link prefix that carries the line information to generate the global IPv6 address of the user.

In the foregoing embodiment, after receiving the first Neighbor Solicitation message or the first router solicitation message from the UE, the AN obtains the subscriber line information corresponding to the UE, adds the subscriber line information to the second Neighbor Solicitation message and sends it to the BNG, instructing the BNG to perform access authentication. Therefore, this embodiment supports implicit authentication based on subscriber line information in the case of IPv6.

Secondly, in the process of processing the global IPv6 address, the BNG and the UE may generate the global IPv6 address according to the subscriber line information. Therefore, the technical solution in this embodiment implements the address allocation and access authentication in IPv6 architecture.

Persons of ordinary skill in the art understand that all or part of the steps of the method specified in any of the embodiments above may be implemented by a program instructing relevant hardware. The program may be stored in a computer readable storage medium. When the program runs, the following steps are performed:

Receiving, on an AN, a first request message from a UE, where the first request message carries an LLA;

obtaining subscriber line information corresponding to the UE; and sending a second request message from the AN to a BNG, where the second request message carries the LLA and the subscriber line information and instructs the BNG to perform access authentication.

The storage medium may be a Read Only Memory (ROM), a magnetic disk, or a Compact Disk-Read Only Memory (CD-ROM).

Detailed above are a network access method, an authentication method, a communications system, and relevant devices under the present invention. Although the invention is described through some exemplary embodiments, the invention is not limited to such embodiments. It is apparent that those skilled in the art can make modifications and variations to the invention without departing from the scope of the invention. The invention is intended to cover the modifications and variations provided that they fall within the scope of protection defined by the following claims or their equivalents.

What is claimed is:

1. A network access method, comprising:

receiving, by an Access Node (AN), a first request message sent from a User Equipment (UE), the first request message carries a Link-Local Address (LLA) automatically configured by the UE;

obtaining, by the AN, subscriber line information corresponding to the UE;
sending a second request message, by the AN, to a Broadband Network Gateway (BNG), wherein the second request message carries the LLA and the subscriber line information and instructs the BNG to perform access authentication; and
receiving, by the AN, an IPv6 packet carrying the LLA sent by the UE if no address in a preset address cache stored on the BNG matches the LLA,
the AN comprises a Digital Subscriber Line Access Multiplexer (DSLAM).

2. The method according to claim 1, wherein:
the LLA is set in an LLA field that carries the LLA, and the subscriber line information is set in a field other than the LLA field;
or,
both the subscriber line information and the LLA are set in the LLA field that carries the LLA in the second request message.

3. The method according to claim 2, wherein:
after the sending the second request message from the AN to the BNG, the method comprises:
receiving, by the AN, a first router solicitation message sent by the UE, wherein the first router solicitation message carries an on-link prefix that is an identifier of an on-link prefix corresponding to the UE;
obtaining the subscriber line information corresponding to the UE; and
sending a second router solicitation message that carries the on-link prefix and the subscriber line information to the BNG.

4. The method according to claim 3, wherein:
after the sending the second router solicitation message, the method further comprises:
receiving a router advertisement message from the BNG, wherein the router advertisement message carries an on-link prefix;
converting the on-link prefix in the router advertisement message into an on-link prefix that carries subscriber line information; and
sending the on-link prefix that carries the subscriber line information to the UE.

5. The method according to claim 1, wherein:
after the sending the second request message from the AN to the BNG, the method comprises:
receiving, by the AN, a first router solicitation message sent by the UE, wherein the first router solicitation message carries an on-link prefix that is an identifier of an on-link prefix corresponding to the UE;
obtaining the subscriber line information corresponding to the UE; and
sending a second router solicitation message that carries the on-link prefix and the subscriber line information to the BNG.

6. The method according to claim 5, wherein:
after the sending the second router solicitation message, the method further comprises:
receiving a router advertisement message from the BNG, wherein the router advertisement message carries an on-link prefix;
converting the on-link prefix in the router advertisement message into an on-link prefix that carries subscriber line information; and
sending the on-link prefix that carries the subscriber line information to the UE.

7. A communications system, comprising:
an Access Node (AN) that comprises a Digital Subscriber Line Access Multiplexer (DSLAM), configured to:
receive a first request message sent by a User Equipment (UE), the first request message carries a Link-Local Address (LLA) automatically configured by the UE,
obtain subscriber line information corresponding to the UE,
send a second request message that carries the LLA and the subscriber line information to a Broadband Network Gateway (BNG), and
receive an IPv6 packet carrying the LLA sent by the UE if no address in a preset address cache stored on the BNG matches the LLA; and
the BNG, configured to:
receive the second request message from the AN, and send an access request to an Authentication, Authorization and Accounting (AAA) server according to the subscriber line information, wherein the access request instructs the AAA server to perform access authentication, and
compare the LLA with the addresses stored in the preset address cache and judge whether any address in the address cache matches the LLA.

8. The communications system according to claim 7, wherein:
the BNG is further configured to: receive an authentication result returned by the AAA server, or send a neighbor advertisement message to reject the LLA carried in the second request message if the authentication result is authentication failure.

9. The communications system according to claim 8, wherein:
the AN is further configured to: receive a first router solicitation message sent by the UE, wherein the first router solicitation message carries an on-link prefix, obtain the subscriber line information corresponding to the UE, and send a second router solicitation message that carries the on-link prefix and the subscriber line information to the BNG, wherein the on-link prefix is an identifier of an on-link prefix corresponding to the UE; and
the BNG is further configured to: receive a router solicitation message from the AN, wherein the router solicitation message carries an on-link prefix, and allocate an address according to the on-link prefix, the subscriber line information, and a preset interface identifier.

10. The communications system according to claim 7, wherein:
the AN is further configured to: receive a first router solicitation message sent by the UE, wherein the first router solicitation message carries an on-link prefix, obtain the subscriber line information corresponding to the UE, and send a second router solicitation message that carries the on-link prefix and the subscriber line information to the BNG, wherein the on-link prefix is an identifier of an on-link prefix corresponding to the UE; and
the BNG is further configured to: receive a router solicitation message from the AN, wherein the router solicitation message carries an on-link prefix, and allocate an address according to the on-link prefix, the subscriber line information, and a preset interface identifier.

11. An Access Node (AN), comprising:
a processor; and
a non-transitory computer readable medium storing instructions executable by the processor to perform operations comprising:

receiving a first request message from a User Equipment (UE), wherein the first request message carries a Link-Local Address (LLA) configured by the UE;

obtaining subscriber line information corresponding to the UE; and sending a second request message to a Broadband Network Gateway (BNG), wherein the second request message carries the LLA and the subscriber line information and instructing the BNG to perform access authentication, wherein the operations further comprise: receiving an IPv6 packet carrying the LLA sent by the UE if no address in a preset address cache stored on the BNG matches the LLA, wherein the AN comprises a Digital Subscriber Line Access Multiplexer.

12. The AN according to claim 11, wherein the operations further comprise:

converting the LLA carried in the first request message into an LLA that carries the subscriber line information, and adding the LLA that carries the subscriber line information to the second request message; and adding the LLA in the first request message and the obtained subscriber line information to different positions or different fields of the second request message.

13. The AN according to claim 12, wherein the operations further comprise:

receiving a first router solicitation message sent by the UE, wherein the first router solicitation message carries an on-link prefix which is an identifier of an on-link prefix corresponding to the UE; and sending a second router solicitation message that carries the on-link prefix and the subscriber line information to the BNG.

14. The AN according to claim 13, wherein the operations further comprise:

adding the subscriber line information to the on-link prefix sent by the BNG, and sending the on-link prefix that carries the subscriber line information to the UE; and forwarding the on-link prefix sent by the BNG and inclusive of the subscriber line information to the UE.

15. The AN according to claim 11, wherein the operations further comprise:

receiving a first router solicitation message sent by the UE, wherein the first router solicitation message carries an on-link prefix which is an identifier of an on-link prefix corresponding to the UE; and sending a second router solicitation message that carries the on-link prefix and the subscriber line information to the BNG.

16. The AN according to claim 15, wherein the operations further comprise:

adding the subscriber line information to the on-link prefix sent by the BNG, and sending the on-link prefix that carries the subscriber line information to the UE; and forwarding the on-link prefix sent by the BNG and inclusive of the subscriber line information to the UE.

\* \* \* \* \*

UNITED STATES PATENT AND TRADEMARK OFFICE
CERTIFICATE OF CORRECTION

| | | |
|---|---|---|
| PATENT NO. | : 8,594,103 B2 | Page 1 of 1 |
| APPLICATION NO. | : 12/883394 | |
| DATED | : November 26, 2013 | |
| INVENTOR(S) | : Ruobin Zheng | |

It is certified that error appears in the above-identified patent and that said Letters Patent is hereby corrected as shown below:

On the Title page, Item [54] (Title), Line 3, and in the Specification, Column 1, Line 3 of the Title
Delete "Systems" and insert -- System --, therefor.

Signed and Sealed this
Twenty-fourth Day of March, 2015

Michelle K. Lee
*Director of the United States Patent and Trademark Office*